UNITED STATES PATENT OFFICE.

WOOLSEY McA. JOHNSON, OF HARTFORD, CONNECTICUT.

METHOD OF TREATING MATTE.

No. 814,049. Specification of Letters Patent. Patented March 6, 1906.

Application filed May 27, 1903. Serial No. 158,936.

*To all whom it may concern:*

Be it known that I, WOOLSEY MCA. JOHNSON, a citizen of the United States, residing at Hartford, in the county of Hartford and State of Connecticut, have invented certain new and useful Improvements in Methods of Treating Matte, of which the following is a specification.

This invention is a method of treating copper-nickel matte and separating therefrom some or all of the contained metals either in reguline form or as oxids.

The method will be described by reference to one specific example thereof.

The copper-nickel matte in the specific instance to be described may contain thirty-nine per cent. of nickel, thirty-nine per cent. of copper, substantially one per cent. each of iron and cobalt, and twenty per cent. of sulfur, together with small proportions of platinum and palladium. This matte is crushed, passed through sixty or eighty mesh screens, placed in dissolving or leaching vats of any suitable construction provided with agitators and subjected therein to the action of a hot solution of sulfuric acid preferably of about five per cent. concentration and at a temperature of 80° to 100° centigrade. The leaching-vats may be provided with any suitable means for heating the acid solution, as is well understood in the art. Said vats should be covered and provided with means for conducting away the hydrogen sulfid formed by reaction of the acid upon the sulfids of the matte. This hydrogen sulfid is conducted to a suitable flue and there burned with admixture of air to form sulfur dioxid, according to the reaction,

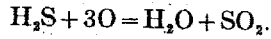
$$H_2S + 3O = H_2O + SO_2.$$

The sulfur dioxid so produced may be converted into sulfuric acid according to known methods, such acid being sold as a by-product or being employed, if desired, for leaching the matte or for treating the residue thereof, as hereinafter described.

The solution obtained contains nickel, cobalt, and iron as sulfates. Said solution is freed from cobalt and iron preferably by treatment with chlorin and caustic soda or sodium carbonate, or by the action of hypochlorites, according to known methods, said chlorin and caustic soda or hypochlorites being preferably prepared by the electrolytic decomposition of sodium-chlorid solutions. The cobalt is recovered from the precipitate as oxid, $(Co_3O_4,)$ and may be sold as such. The resultant nickel-sulfate solution is then treated with caustic soda, whereby the nickel is separated as hydrate, said hydrate being, if desired, dried, calcined, and reduced to metal or the nickel-sulfate solution may be electrolyzed with insoluble anodes to obtain the metal, nickel hydroxid being added to the electrolyte and dissolved by the acid liberated, whereby the substantial neutrality of the solution is maintained at all times; or I may proceed as follows: Nickel hydroxid precipitated as above stated is dissolved to neutralization by sulfuric acid, and the nickel-sulfate solution resulting is electrolyzed, nickel being separated and nickel hydrate being added to or being present in the bath and passing into solution as fast as the nickel is precipitated, thereby keeping the solution neutral; or, if desired, the nickel hydroxid may be dissolved in hydrochloric acid and the resulting nickel-chlorid solution electrolyzed with anodes of graphite in a cell provided with a diaphragm, the nickel being separated as metal and the chlorin utilized for the production of liquid chlorin or bleaching-powder. The residue from the acid treatment of the matte consists chiefly of copper sulfid, together with such quantities of platinum and palladium as may have been present in the original matte, and a proportion of undissolved nickel sulfid. This residue is roasted to oxid, the gases evolved being preferably passed through the copper electrolyte, hereinafter described. The roasted residue is treated with sulfuric acid, whereby a solution is obtained which may contain, in the specific example given, substantially nine per cent. of copper and one per cent. of nickel in the form of sulfates. Said solution is electrolyzed with anodes of lead, the gases from the roasting operation being passed through the bath, said gases serving the double purpose of reducing the electromotive force necessary for the electrolysis and yielding sulfuric acid in such quantity that the acid formed during the precipitation of a given quantity of copper upon the cathode is sufficient to subsequently dissolve both the nickel and copper of the residue. This electrolysis is continued until the copper content of the electrolyte is reduced to about 0.8 per cent. or to such other proportion as may be desired, and the spent acid electrolyte containing also the acid derived from the roasting-gases is thereupon returned to the liquid in the vats for the leaching of roasted residue. The solution formed is again electrolyzed, as above described.

When the proportion of nickel in this copper electrolyte has risen to such an extent as to interfere with the deposition of copper, (say eight per cent. nickel as a limit,) the electrolyte is pumped to a second series of electrolytic vats provided with rotary cathodes and electrolyzed therein until the copper is reduced to about 0.4 per cent. This electrolyte is then returned to the vats for leaching the original matte. In such vats the sulfuric acid in the spent copper electrolyte is available for the solution of further amounts of iron, cobalt, and nickel, while the remaining copper is precipitated by the hydrogen sulfid evolved by the treatment, the small quantities of cupric sulfid thereby formed remaining with the residue in these vats and being again roasted and dissolved therewith in the continuation of the treatment, as above described.

The undissolved residue from the treatment of the roasted residue from the vats is worked according to known chemical methods for the separation of platinum and palladium.

I claim—

1. The herein-described method which consists in subjecting copper-nickel matte to the action of sulfuric acid, thereby dissolving nickel and liberating hydrogen sulfid, and leaving a residue consisting in part of copper sulfid; roasting said residue to oxid and leaching same with sulfuric acid, thereby forming a solution containing copper sulfate; electrolyzing said solution to separate a portion of the copper; and returning the spent electrolyte to the leaching-vats, as set forth.

2. The herein-described method which consists in subjecting copper-nickel matte to the action of hot dilute sulfuric acid, thereby dissolving nickel and liberating hydrogen sulfid, and leaving a residue consisting in part of copper sulfid; roasting said residue to oxid and leaching same with sulfuric acid, thereby forming a solution containing copper sulfate; electrolyzing said solution to separate a portion of the copper; and returning the spent electrolyte to the leaching-vats, as set forth.

3. The herein-described method which consists in subjecting copper-nickel matte to the action of sulfuric acid, thereby dissolving nickel and liberating hydrogen sulfid, and leaving a residue consisting in part of copper sulfid; recovering the nickel from the solution; roasting said residue to oxid and leaching same with sulfuric acid, thereby forming a solution containing copper sulfate; electrolyzing said solution to separate a portion of the copper; and returning the spent electrolyte to the leaching-vats, as set forth.

4. The herein-described method which consists in subjecting copper-nickel matte to the action of hot dilute sulfuric acid, thereby dissolving nickel and liberating hydrogen sulfid, and leaving a residue consisting in part of copper sulfid; recovering the nickel from the solution; converting said hydrogen sulfid to sulfuric acid; roasting said residue to oxid and leaching same with sulfuric acid, thereby forming a solution containing copper sulfate; electrolyzing said solution to separate a portion of the copper, and returning the remaining solution to the leaching-vats, as set forth.

5. The herein-described method which consists in subjecting copper-nickel matte to the action of sulfuric acid, thereby dissolving nickel and liberating hydrogen sulfid, and leaving a residue consisting in part of copper sulfid, roasting said residue to oxid and leaching same with sulfuric acid, thereby forming a solution containing copper sulfate; electrolyzing said solution to separate a portion of the copper; returning the solution to the roasted residue and repeating the electrolysis, and finally returning the spent electrolyte to the leaching-vats for the matte, as set forth.

6. The herein-described method which consists in subjecting copper-nickel matte to the action of sulfuric acid, thereby dissolving nickel and liberating hydrogen sulfid, and leaving a residue consisting in part of copper sulfid; roasting said residue to oxid and leaching same with sulfuric acid, thereby forming a solution containing copper sulfate; electrolyzing said solution to separate a portion of the copper; returning the solution to the roasted residue and repeating the electrolysis until the presence of nickel interferes with the deposition of the copper; depositing further quantities of copper upon rotary cathodes, and finally returning the spent electrolyte to the leaching-vats for the matte, as set forth.

7. The herein-described method of electrolyzing nickel solutions, which consists in maintaining the bath in a state of substantial neutrality by the solution therein of nickel hydroxid, as set forth.

8. The herein-described method of electrolyzing nickel solutions which consists in adding to the bath nickel hydroxid in quantity proportionate to the metal separated at the cathode, whereby the substantial neutrality of the bath is maintained, as set forth.

9. The herein-described method of treating material containing nickel and copper as sulfids, which consists in roasting the same, dissolving the roasted residue in sulfuric acid, electrolyzing the solution with insoluble anodes while passing into the electrolyte the gases derived from the roasting operation, and returning the acid electrolyte to the roasted material, as set forth.

10. The herein-described method of treating material containing nickel and copper as sulfids, which consists in roasting the same, dissolving the roasted residue in sulfuric acid, electrolyzing the solution with anodes of lead while passing into the electrolyte the gases derived from the roasting operation, and returning the acid electrolyte to the roasted material, as set forth.

In testimony whereof I affix my signature in presence of two witnesses.

WOOLSEY McA. JOHNSON.

Witnesses:
CHARLES M. STARKWEATHER,
O. V. MARSH.